Patented Dec. 18, 1923.

1,477,797

UNITED STATES PATENT OFFICE.

NATHAN H. ADAMS, OF SCHENECTADY, NEW YORK, ASSIGNOR TO GENERAL ELECTRIC COMPANY, A CORPORATION OF NEW YORK.

WEAR-RESISTING BODY.

No Drawing.  Application filed December 30, 1919.  Serial No. 348,413.

*To all whom it may concern:*

Be it known that I, NATHAN H. ADAMS, a citizen of the United States, a resident of Schenectady, in the county of Schenectady, State of New York, have invented certain new and useful Improvements in Wear-Resisting Bodies, of which the following is a specification.

The present invention comprises a novel bearing material which combines efficiency and durability, and is operable advantageously under trying conditions, such as unusually high pressures and high temperature.

The bearing made in accordance with my invention consists of particles of a hard, wear resisting material, such, for example, as tungsten or molybdenum, and a soft malleable metal, such, for example, as copper, which is not appreciably alloyable with the harder metal, the mixture being intimately commingled and consolidated to form a homogeneous, coherent body. In some cases additions of other materials, such, for example, as graphite, may be made to my bearing composition.

A preferred embodiment of my invention is made by intimately mixing about nine parts by weight of finely divided metallic tungsten with about one part of finely divided copper. These proportions may be departed from within the scope of my invention, depending on the characteristics desired in the finished product. The mixture is consolidated in a hydraulic press, or other suitable means, to form a coherent body. A pressure of about 10 tons per square inch is preferred. The resulting material is fired, preferably in a hydrogen atmosphere, at a temperature of 1200° to 1600° C., that is, above the fusing point of the binder metal.

The bearing metal of the above composition is of a silvery white color with a slight coppery tint. It is strong enough mechanically to be machined into almost any desired form, such, for example, as rings or cylinders. It will take a high polish and is capable of resisting high pressure without deformation. As a bearing material it is particularly to be recommended for heavy duty uses, that is where the bearing surfaces are subjected to a heavy pressure, and also where the bearing surfaces are operated at high speed. Even when a bearing containing my improved material becomes heated there is no tendency for the bearing surface to stick and score.

In my opinion the tungsten particles in the finished product constitute a hard, wear-resisting skeleton, and the copper acts both as a binder and a conductor of heat.

When in the appended claims specific reference is made to tungsten, I desire thereby also to include equivalent hard, wear-resisting materials as for example, molybdenum suitable for use in my improved material.

What I claim as new and desire to secure by Letters Patent of the United States, is:—

1. A bearing comprising an intimate mixture of tungsten and copper, consolidated to form a machinable, pressure-resisting composite material, capable of operation under high pressure and at high temperature without deterioration.

2. A bearing composition comprising an intimate mixture of about nine parts of tungsten and one part of copper by weight, said mixture constituting a coherent, pressure-resisting, machinable material capable of taking a high polish.

In witness whereof, I have hereunto set my hand this 29th day of December, 1919.

NATHAN H. ADAMS.